United States Patent [19]

Nishida

[11] Patent Number: 5,138,503
[45] Date of Patent: Aug. 11, 1992

[54] FIELD OR FRAME RECORDING METHOD AND APPARATUS FOR AN ELECTRONIC STILL CAMERA

[75] Inventor: Syuuzou Nishida, Higashi-Hiroshima, Japan

[73] Assignee: Sharp Kabushiki Kaisha, Osaka, Japan

[21] Appl. No.: 436,558

[22] Filed: Nov. 14, 1989

[30] Foreign Application Priority Data

Nov. 16, 1988 [JP] Japan ................................ 63-289604

[51] Int. Cl.⁵ .............................................. A04N 5/78
[52] U.S. Cl. .................................. 360/35.1; 360/14.1; 358/311; 358/909
[58] Field of Search ...................... 360/35.1, 10.2, 33.1, 360/14.1; 358/312, 310, 335, 906, 311, 909, 213.25, 213.26

[56] References Cited
U.S. PATENT DOCUMENTS 4,816,929 3/1989 Bradley et al. ................ 360/35.1 X
4,894,732 1/1990 Ueda .................................. 360/10.1
4,939,593 7/1990 Yuuchi et al. ................ 360/35.1 X

FOREIGN PATENT DOCUMENTS 60-98780 6/1985 Japan .

*Primary Examiner*—Andrew L. Sniezek
*Attorney, Agent, or Firm*—David G. Conlin; Robert M. Asher

[57] ABSTRACT

A still image recording method and apparatus for recording still images on a recording medium. The apparatus has memories for storing image signals of a plurality of fields. After synchronization of the image signals in the neighboring field with each other as is executed, accumulation value of differences between each of the synchronized image signals for one field is calculated. When the accumulation value is not above a predetermined value, frame recording on the recording medium is carried out. When the accumulation value is above the predetermined value, field recording on the recording medium is executed.

21 Claims, 7 Drawing Sheets

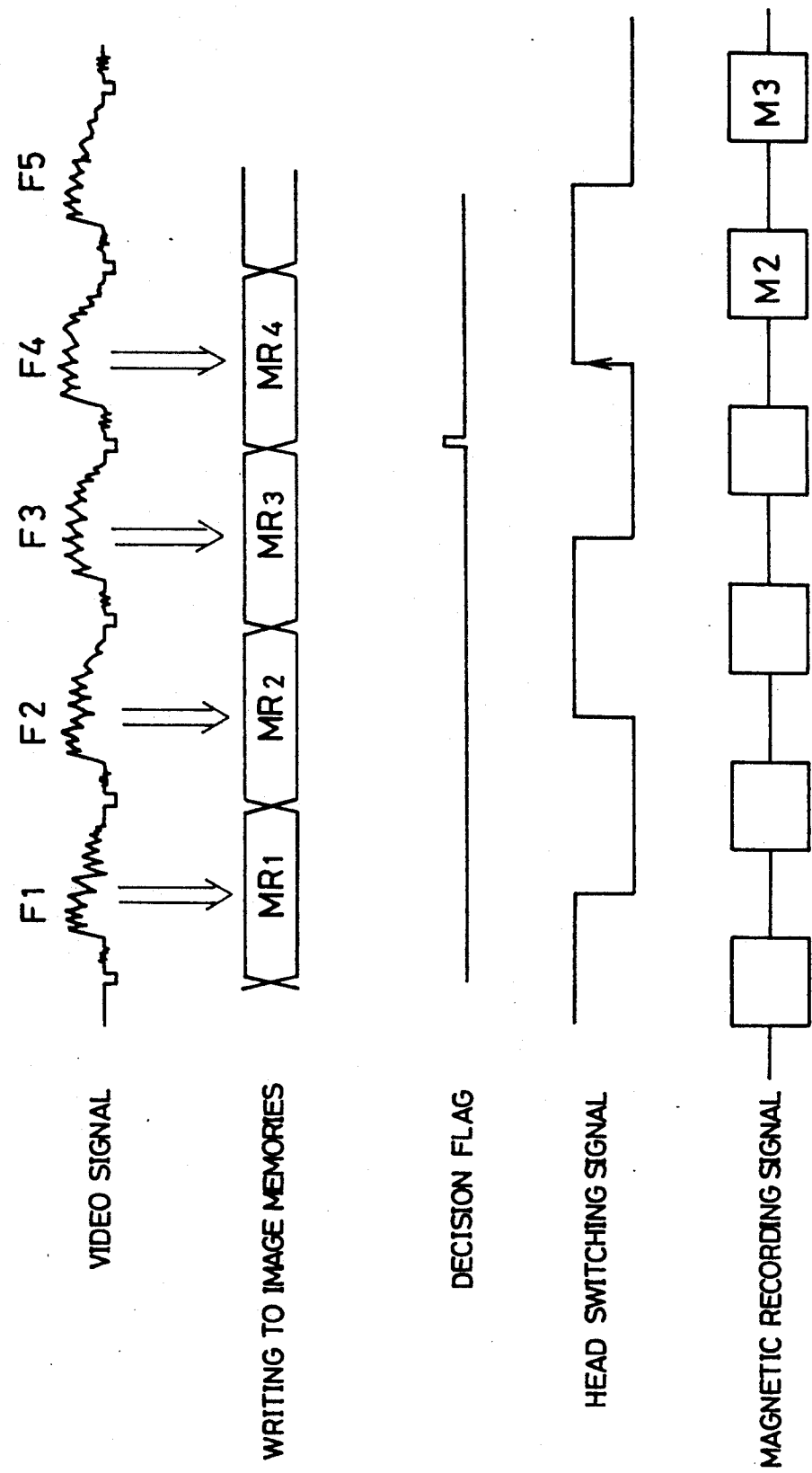

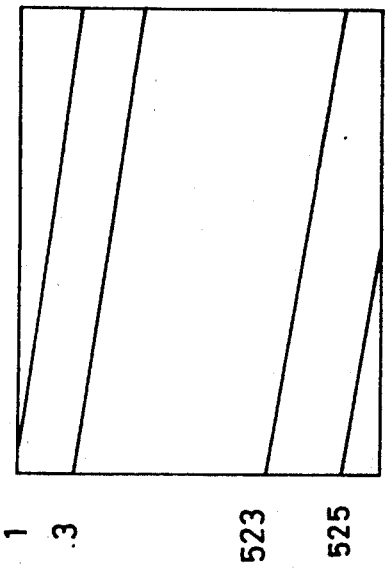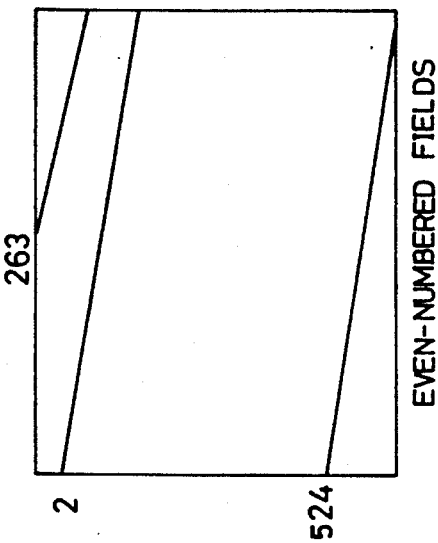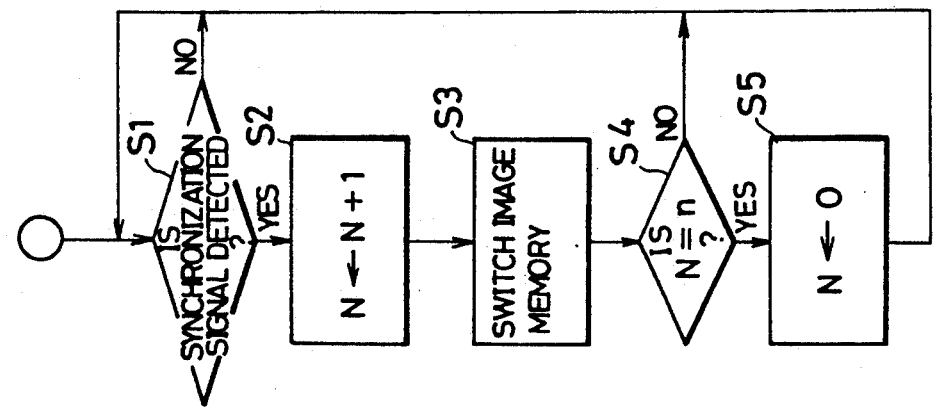

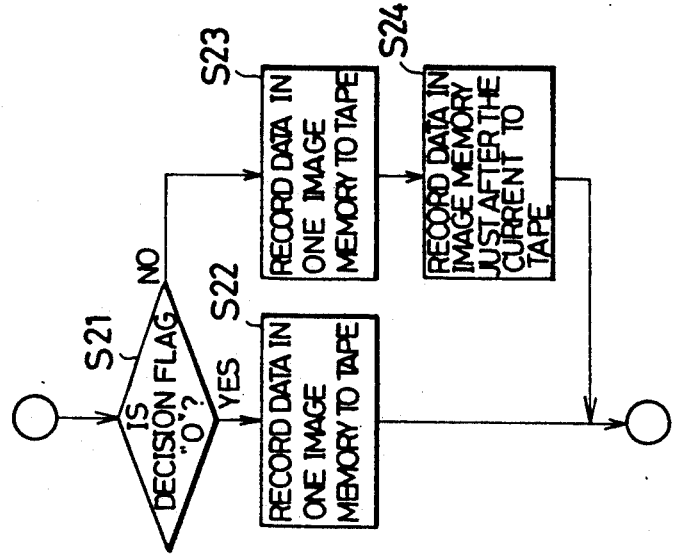
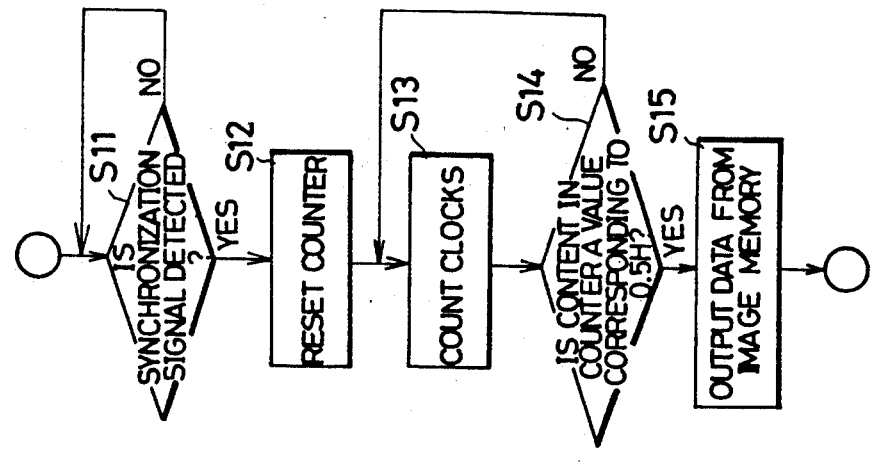

FIELD OR FRAME RECORDING METHOD AND APPARATUS FOR AN ELECTRONIC STILL CAMERA

BACKGROUND OF THE INVENTION

1. Field of the Invention

The present invention relates to a method for recording still images on a recording medium and to an apparatus used with such method.

2. Description of the Related Art

For a device for recording still images, various devices such as a VTR (Video Tape Recorder), a video disk recorder, etc. exist. One of these devices is an electronic still camera.

The electronic still camera is so arranged that image signals of each picture picked up by a solid-state image pickup device are recorded on a magnetic medium such as a floppy disk, and image signals can be then read out from this floppy disk when desired. For the image signals, television signals are used, and in case of color, generally the NTSC (National Television System Committee) system is adopted.

The electronic still camera is so arranged that one picture can be selectively recorded in either one field or one frame. When one picture is recorded in one field (field recording), though the quality of the recorded images becomes low, a fast-moving object being image can be picked up and recorded, and more pictures can be written onto one floppy disk. When one picture is recorded in one frame (frame recording), the quality of a recorded image is high. However, according to the frame recording, there exists the problem that blurs occur in the picture of the fast-moving object. Furthermore, the number of pictures that can be written on one floppy disk is reduced. The electronic still camera is therefore arranged so that the user can choose between the two methods for recording.

However, the need for the user to select between field recording and frame recording each time is annoying, and further it is difficult to switch quickly to the choice most appropriate to the situation.

SUMMARY OF THE INVENTION

It is therefore an object of the present invention to provide a still image recording method and apparatus capable of most appropriately and automatically selecting the field recording and the frame recording according to the situation of the picture to be recorded.

According to the present invention, the above-described object can be attained by a still image recording method which records still images on a recording medium, comprising the steps of storing image signals of a plurality of fields, supplied in sequence, synchronizing the image signals in neighboring fields with each other, calculating accumulation value of difference between each of the synchronized image signals for one field, judging whether or not the calculated accumulation value of the differences is above a predetermined value to generate a signal representing the result of the judgment, and executing frame recording on the recording medium when the ,generated signal indicates that the accumulation value is not above the predetermined value, and field recording on the recording medium when the signal indicates that the accumulation value is above the predetermined value.

Further, the above-described object is attained by a still image recording apparatus having a recording medium for recording still images, means for storing image signals of a plurality of fields, supplied in sequence, means for synchronizing the image signals in the neighboring fields, means for calculating accumulation value of difference between each of the synchronized image signals for one field, means for judging whether or not the calculated accumulation value of the differences is above a predetermined value to generate a signal representing the result of the judgment, and means for executing frame recording in the recording medium when the generated signal indicates that the accumulation value is not above the predetermined value, and for executing field recording in the recording medium when the signal indicates that the accumulation value is above the predetermined value.

In the case of an image that does not change fast, the accumulated value of the differences between the image signals in the neighboring fields is not above the predetermined value. Accordingly, in this case, smooth, high-quality still images are recorded by carrying out frame recording. In contrast to this, in the case of an image that changes fast, the accumulated value is above a predetermined value, so field recording is carried out to prevent blurs. Field recording or frame recording is appropriately and quickly selected automatically according to the degree of the movement of an image for which a still image is to be recorded in this manner.

The still image recording apparatus according to the present invention should preferably be equipped with means for sequentially converting analog video signals into digital image signals.

The storing means may preferably be equipped with a plurality of image memories each of which can store image signals of one field.

The still image recording apparatus according to the present invention may preferably be equipped with means for detecting a vertical synchronization signal in each field of the analog video signals, and means for controlling the switching of the image memories according to the detected vertical synchronization signal.

The image signals in the neighboring fields may be formed of the image signals in the current field and the image signals in the field stored in the image memory just before.

The image signals in the neighboring fields may be formed of the image signals in the two fields stored in the successive image memories.

In order to synchronize the image signals in the neighboring fields with each other, the still image recording apparatus should preferably be equipped with means for delaying the image signals in the preceding field for half the horizontal scanning period in comparison with the image signals in the succeeding field.

The calculating means may preferably include a subtracter for calculating the differences between the synchronized image signals in the two fields.

The calculating means may preferably include with means for adding the calculated differences with each other for one field to obtain accumulation value of the differences.

The judging means may preferably include a comparator for comparing the calculated accumulation value obtained from the adding means with a predetermined value.

The executing means may preferably be equipped with means for selecting either frame recording or field recording after a plurality of fields have been judged.

The recording medium may preferably include a magnetic storage medium which is detachable from the still image recording apparatus.

The recording medium may preferably include a fixed storage medium which is detachable from the still image recording apparatus.

The still image recording apparatus according to the present invention may preferably include means for picking up a picture of an object image and a signal processing means for producing video signals from signal from pickup means.

Further objects and advantages of the present invention will be apparent from the following description of the preferred embodiments of the invention as illustrated in the accompanying drawings.

BRIEF DESCRIPTION OF THE DRAWINGS

FIG. 7 shows signal waveforms of each section in the embodiment of FIG. 1;

FIG. 8 shows a program in which a selected image signal is stored in an image memory;

FIGS. 9a and 9b show deviations at the starting points between odd numbered fields and even-numbered fields;

FIG. 10 shows a program that executes synchronization control for delaying by 0.5 H;

FIG. 11 shows a program that carries out field recording or frame recording according to a decision flag;

FIG. 12 shows a recording format of each track;

DESCRIPTION OF THE PREFERRED EMBODIMENTS

Figure 1:
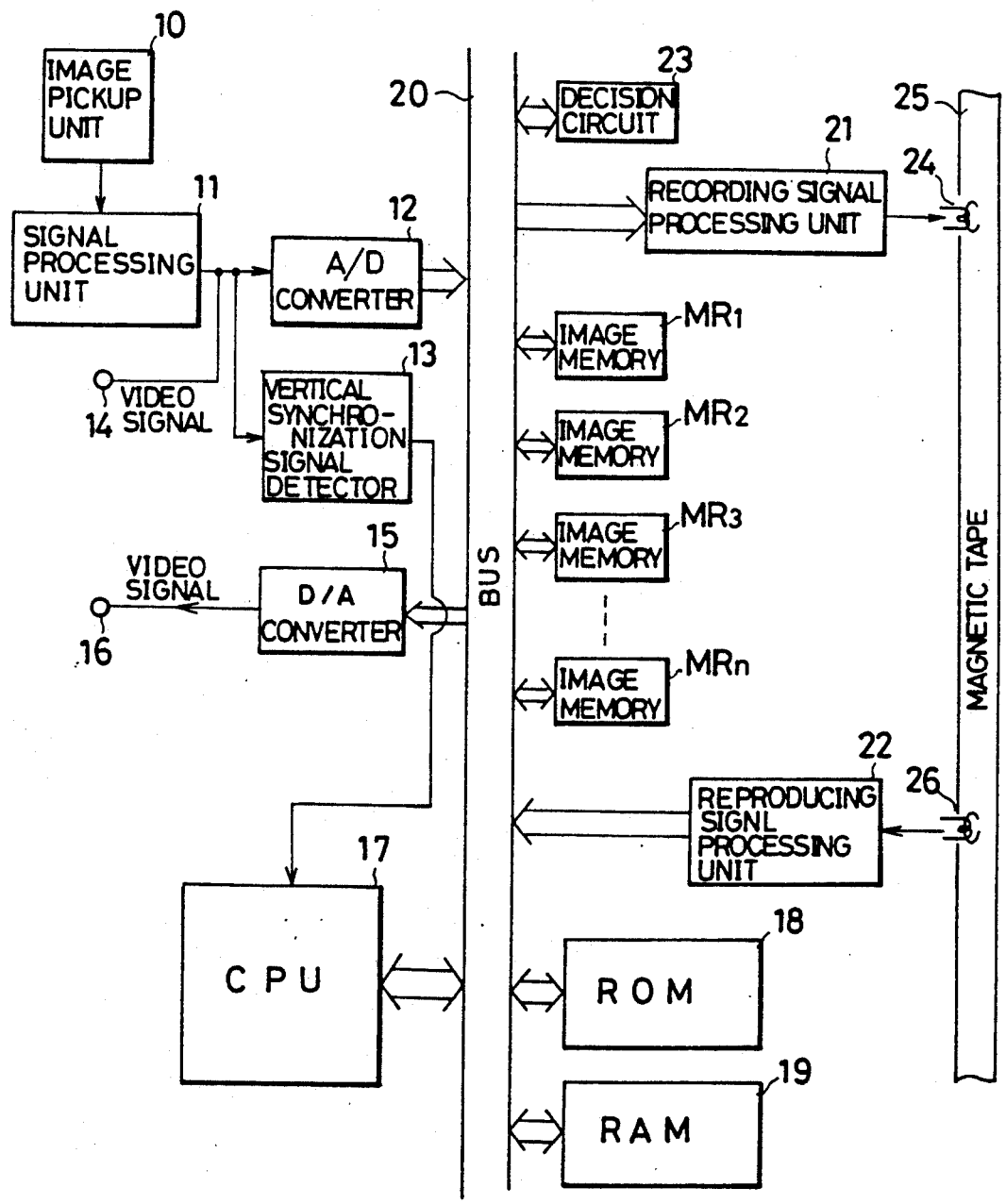
FIG. 1 shows a schematic electrical construction of an electronic still camera as an embodiment of a still image recording apparatus according to the present invention.

FIG. 1 shows a schematic electrical construction of an electronic still camera as a preferred embodiment of the still image recording apparatus according to the present invention.

In FIG. 1, reference numeral 10 denotes, for example, an image pickup unit made up of solid-state image pickup devices, and 11 a signal processing unit connected to the image pickup unit 10. The signal processing unit 11 produces a video signal of the NTSC system from the three primary colors provided from the image pickup unit 10. An A/D (Analog/Digital) converter 12 and a vertical synchronization signal detector 13 for detecting a vertical synchronization signal of the video signal of the NTSC system are connected to the output side of this signal processing unit 11. The electronic still camera may be constructed in such a way that an external image input terminal 14 is provided in place of or along with the image pickup unit 10 and with the signal processing unit 11, and a video signal supplied from the outside via this external image input terminal 14 is applied to the A/D converter 12 and to the vertical synchronization signal detector 13. The output terminal of the vertical synchronization signal detector 13 is connected to a CPU (Central Processor Unit) 17 to be described later.

In FIG. 1, reference numeral 15 denotes a D/A (Digital/Analog) converter. An external output terminal 16 is connected to the output side of this D/A converter 15. An image display device may be connected to the external output terminal 16 as needed.

The output side of the A/D converter 12 and the input side of the D/A converter 15 are connected to the CPU 17, a ROM (Read Only Memory) 18, and a RAM (Random Access Memory) 19 constituting a part of a microcomputer via a bus 20. The bus 20 is further connected with a plurality of image memories MR1 to MRn, a recording signal processing unit 21, a reproducing signal processing unit 22 and a decision circuit 23. Each image memory has a capacity to store image signals of one field. The number of the image memories is more than one, but is preferably four considering the manufacturing cost of the electronic still camera.

Figure 2:
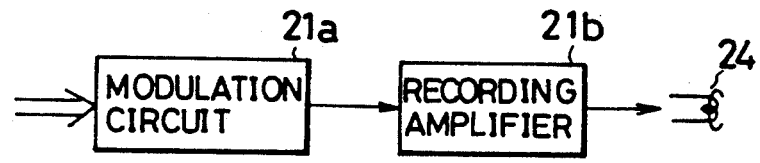
FIG. 2 shows a schematic electrical construction of an example of a recording signal processing unit in the embodiment of FIG. 1.

The recording signal processing unit 21 is used to convert digital image data, subcodes and signals for servos into magnetic recording signals The magnetic recording signals from the recording signal processing unit 21 is written on a magnetic tape 25 via a magnetic head 24. The magnetic tape 25 may be, for example, an ordinary magnetic tape for VTR and DAT (Digital Audio Tape recorder), and is detachable from the electronic still camera. As shown in FIG. 2, this recording signal processing unit 21 is formed by a modulation circuit 21a and a recording amplifier 21b. The modulation circuit 21a converts digital image data read out from the image memory into magnetic recording signals on the basis of, for example, the FM (Frequency Modulation) method or ETM (Eight to Ten Modulation) method. The magnetic head 24 is connected to the output side of the recording amplifier 21b.

Figure 3:
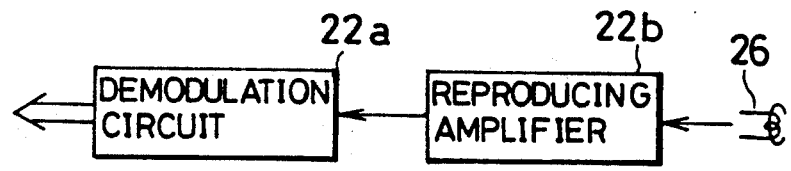
FIG. 3 shows a schematic electrical construction of an example of a reproducing signal processing unit in the embodiment of FIG. 1.

The reproducing signal processing unit 22 is used to convert magnetic recording signals read out from the magnetic tape 25 via a magnetic head 26 to digital image data. As shown in FIG. 3, this reproducing signal processing unit 22 is formed by a reproducing amplifier 22a connected to the magnetic head 26 and a demodulation circuit 22b based on the recording method in use.

Figure 4:
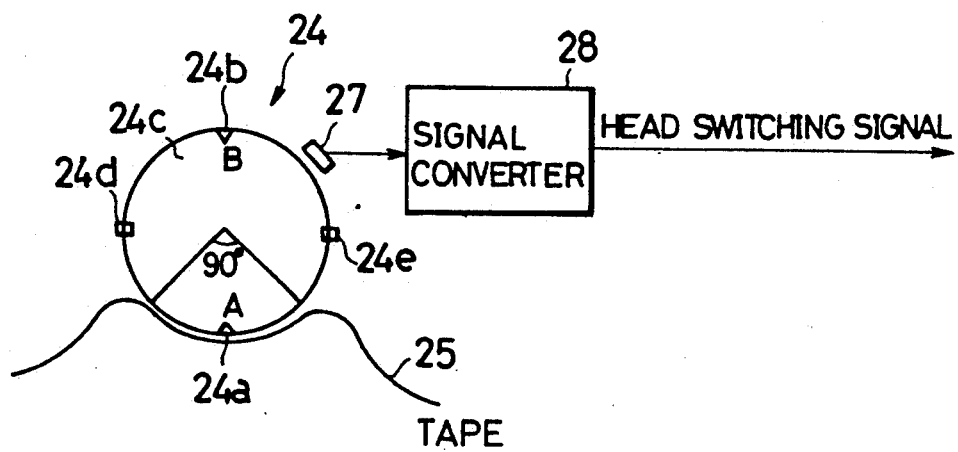
FIG. 4 shows an example of the construction of a magnetic head and a head switching signal generation section in the embodiment of FIG. 1.
Figure 5:
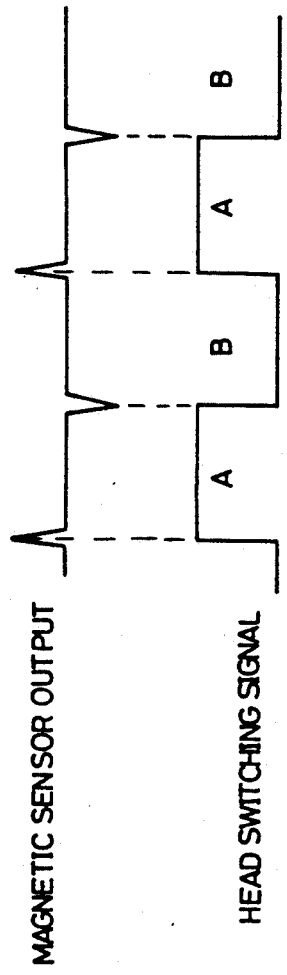
FIG. 5 shows signal waveforms in the head switching signal generation section of FIG. 4.

In this embodiment, the method for recording digital image data on the magnetic tape 25 is the same method as that for DAT. Accordingly, the magnetic heads 24 and 26 are rotary heads. As shown in FIG. 4 in which the magnetic head 24 is illustrated as an example, an A head 24a and a B head 24b are positioned 180° opposite each other on the circumference of a rotary drum 24c. The winding angle of the magnetic tape 25 to the rotary drum 24c is 90 degrees. One of the A head 24a and the B head 24b, which one head is in contact with the magnetic tape 25, is arranged to operate. The switching of this operation is performed in accordance with head switching signals. The head switching signals are generated by two magnets 24d and 24e mounted on the rotary drum 24c, a magnetic sensor 27 which may be formed by magnetic resistance element, and a signal converter 28. That is, when the magnetic sensor 27 detects the magnet 24d, an upward pulse is generated, and when the magnetic sensor 27 detects the magnet 24e, a downward pulse is generated. These outputs are converted by the signal converter 28 into the head switching signal shown in FIG. 5.

Figure 6:
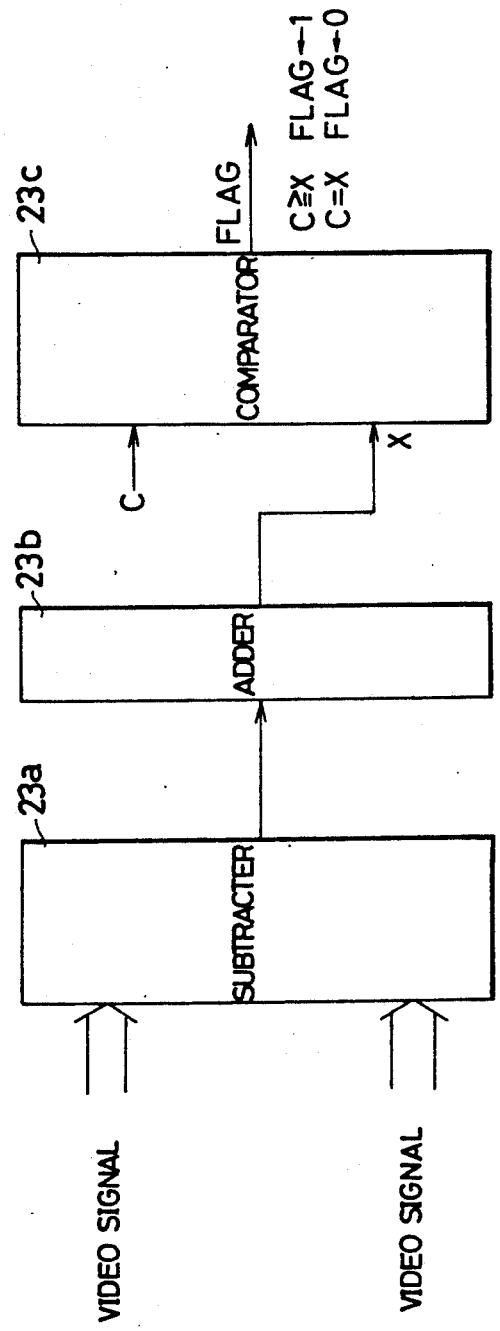
FIG. 6 shows a schematic electrical construction of an example of a decision circuit in the embodiment of FIG. 1.

As shown in FIG. 6, the decision circuit 23 includes a subtracter 23a for outputting the differences between the sampled image signals of the two fields sequentially applied via the bus 20, and an adder 23b for adding the differences from the subtracter 23a with each other to obtain accumulation of the differences. The circuit 23 further includes a comparator 23c for comparing the output of the adder 23b with a predetermined value to produce a decision flag in accordance with the result of the comparison. The decision flag from the comparator 23c is applied to the CPU 17 via the bus 20.

The operation of the above-mentioned embodiment will be explained below.

The NTSC video signal from the image pickup unit 10 via the signal processing unit 11 or from the outside via the external image input terminal 14 is converted in turn into a digital image signal by the A/D converter 12. The sampling frequency in this case is set to four times the frequency $f_{sc}$ of a color signal carrier, i.e., 4 $f_{sc}$.

The image signal in each field converted into a digital form in turn by the A/D converter 12 is stored in the image memories MR1 to MRn in units of one field. In other words, as shown in FIG. 7, the NTSC video signal F1 of the first field is A/D-converted, then the digital image data corresponding to the video signal F1 are stored in the image memory MR1. The image data corresponding to the video signal F2 of the next second field are stored in the image memory MR2, and similarly to the above, the image data corresponding to F3 of the third field are stored in the image memory MR3, while the image data corresponding to Fn of the n-th field are stored in the image memory MRn.

The CPU 17 carries out the program of FIG. 8, in which selected image data are stored in the image memory. First, at step S1, it is judged whether the vertical synchronization signal detector 13 (FIG. 1) has detected the vertical synchronization signal of the NTSC video signal. Only in the case of 'YES' does the program go to step S2, where the content N in a counter is incremented by one (N←N+1), then at step S3, the switching of the image memory is carried out. That is, the address of the image memory in which image data are stored is switched to the address of the next image memory (N-th image memory). When the next step S4 judges that the content N in the counter is equal to the number n of the image memories (i.e., last image memory reached), the program goes to step S5 where N is reset to zero (N←0), after which image data are stored in turn beginning with the image memory MR1 again.

The image data in each field converted by the A/D converter 12 are also in turn applied to the decision circuit 23 at the same time they are stored in turn in the image memories MR1 to MRn. To the decision circuit 23 is further applied from the corresponding image memory, in turn, the image data in the field just before the field which is now input. For example, if the image data in the second field is applied to the decision circuit 23 and stored in the image memory MR2, the image data in the first field is read out from the image memory MR1 and applied to the decision circuit 23 in synchronization with the above-mentioned image data in the second field. The image data in the field just before the field read out from the image memory is synchronized with the image data in the current field so as to delay for 0.5 H, where H indicates horizontal scanning period of a video signal. The reason for this synchronization delay for 0.5 H is, as shown in FIGS. 9a and 9b, the starting time for the odd-numbered fields and the even-numbered fields lag by 0.5 H, so this lag is compensated for synchronization.

The CPU 17 executes the program shown in FIG. 10, to carry out the above-described synchronization control. First, at step S11, the CPU 17 judges whether or not the vertical synchronization signal detector 13 (FIG. 1) has detected a vertical synchronization signal of the NTSC system video signal. Only in the case of 'YES' does the CPU 17 go to step S12, where the counter for delay is reset to zero, and at the next step S13, clocks are counted. At the next step S14, the CPU 17 judges whether or not the content in the counter for delay has become a value corresponding to 0.5 H. If is 'NO', the CPU 17 continues to count. Only in the case of 'YES' does the CPU 17 go to step S15, where an image data in the field just before the current field is read out from the image memory ((N-1)th image memory) and applied to the decision circuit 23. As a result, the image data in the field just before the current field is synchronized with the image data in the current field so as to be delayed for 0.5 H.

When the image data in the current field and the image data in the field just before it are applied to the decision circuit 23, the difference between them for each sampling is calculated in the subtracter 23a in sequence. The calculated differences are added with each other in the adder 23b, and the accumulated value X of the differences is obtained. The accumulated value X is compared with a predetermined value C at the comparator 23c. When $C \geq X$, the decision flag output from the comparator 23c is set to one. When $C < X$, the decision flag is reset to zero. This decision flag is applied to the CPU 17.

It may be arranged that image data in one field which have already been stored in the two neighboring memories of the image memories MR1 to MRn is read out in sequence and input to the decision circuit 23, and a decision is made from the differences obtained between them.

After the image data in the neighboring fields in the image memories MR1 to MRn are judged in sequence, or each time the judgment is made, the CPU 17 chooses whether to carry out the field recording or the frame recording depending on whether the decision flag is unchanged from "0" or is changed to "1". This choosing is accomplished by executing the program shown in FIG. 11. First, at step S21, it is judged whether or not the decision flag has been unchanged from "0". When 'YES', the CPU 17 goes to step S22, where data in single field is read out from only one image memory and written on the magnetic tape 25. As a result of this operation, field recording is performed. On the other hand, when the decision flag is 'NO', at step S23, data in one field is read out from one image memory, and written on the magnetic tape 25. Then, at the next recording timing (for example, at the timing of the next above-described head switching signal), data in another one field is read out from the image memory just after the above-mentioned image memory, and written on the magnetic tape 25 (at step S24). As a result of this operation, frame recording is performed.

An identification flag for indicating the field recording or the frame recording in addition to the image data is written on the magnetic tape 25. This identification flag is written on the subcode area of the magnetic tape 25. For the recording format of each track of the magnetic tape 25, for example, as shown in FIG. 12, the subcode area and the area for servo signals which is called ATF (Automatic Track Finding) are prepared in the front and back of the data area for recording image data. The recording of an identification flag on the subcode area different from the data area enables the identification flag to be read out first at reproducing time, thereby enabling an appropriate reproduction processing according to this identification flag.

Figure 13:
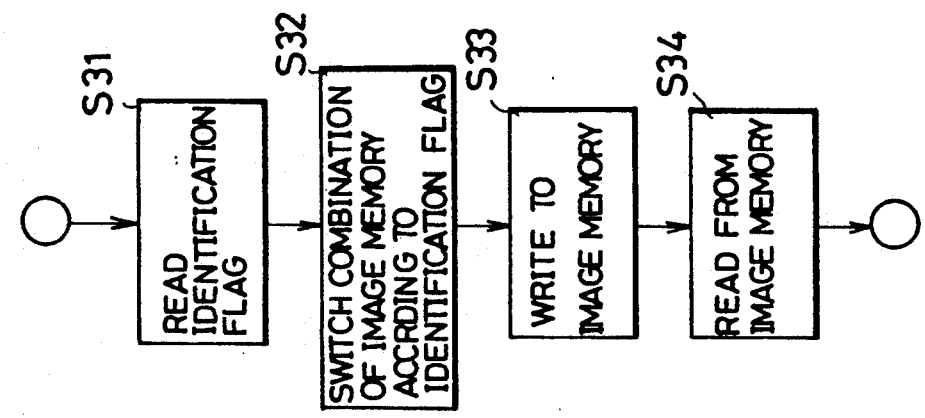
FIG. 13 shows a program that reads out image signals from a magnetic tape.

In case of the example of FIG. 7, the differences between the image data in the first field stored in the image memory MR1 and the image data in the second field stored in the image memory MR2 are large, and the interrelation is judged to be small. The decision flag remains at "0". In contrast to this, the differences between the image data in the second field stored in the image memory MR2 and the image data in the third field stored in the image memory MR3 are small, and the interrelation is judged to exist. The decision flag is set at "1" for a predetermined period. As a result, the image data in two fields are sequentially read out from the image memories MR2 and MR3 by the timing of the next head switching signal, and are written on the magnetic tape 25 as the magnetic recording signals M2 and M3 in one frame. On the other hand, when the decision flag is unchanged from "0" after all the image data in the succeeding fields in the image memories MR1 to MRn are judged, field recording is carried out. In this case, the image data in any one of fields, that is, the image data in any one of image memories, may be written on the magnetic tape 25. The CPU 17 carries out the program shown in FIG. 13 to reproduce the image data recorded on the magnetic tape 25. First, at step S31, the identification flags written on the subcode area of each track of the magnetic tape 25 are read out. At the next step S32, depending on the contents of the identification flag, that is, depending on whether they show the field recording or the frame recording, the combination of the image memories is switched. For example, in the case of field recording, the combination is switched so as to use only the image memory MR1, and in the case of frame recording, it is switched so as to use a combination of the image memories MR1 and MR2. Next, at step S33, the image data recorded on the data area of the magnetic tape 25 are read out and written on the image memory. When the writing is complete, image data are read out from the image memory, and converted by the D/A converter 15, after which it is output to the outside as a video signal (at step S34).

When image data are read out from the image memory and written on the magnetic tape by field recording, the recording density on the magnetic tape can be lowered if this operation is carried out for a period two times as long as an ordinary field period. Therefore, data can be added and written on this portion for future use. To perform reading and writing for a period twice as long as the ordinary period, a clock of a frequency half an ordinary frequency should be used. When recording is carried out in such a manner, naturally, reading from the magnetic tape and writing on the image memory are carried out for a period twice as long as the ordinary period.

In the embodiment described above, although the magnetic heads 24 and 26 are formed by rotary heads, they may be formed by fixed heads.

Figure 14:
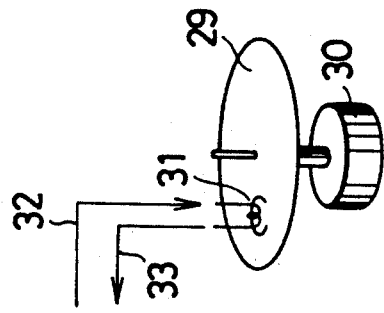
FIG. 14 schematically shows a portion of another embodiment according to the present invention using a magnetic disk.

In the above-described embodiment, as a medium for recording still images, a magnetic tape is used. However, as shown in FIG. 14, for example, a magnetic disk such as a floppy disk may be employed. In FIG. 14, reference numeral 29 designates a magnetic disk, 30 a motor for driving the magnetic disk, and 31 a fixed magnetic head. The fixed magnetic head 31 is connected with writing and reading circuits like the recording signal processing unit 21 and the reproducing signal processing unit 22 of FIG. 1 via wires 32, 33. In this example, the same operation as for the above-described embodiment may be carried out.

Figure 15:
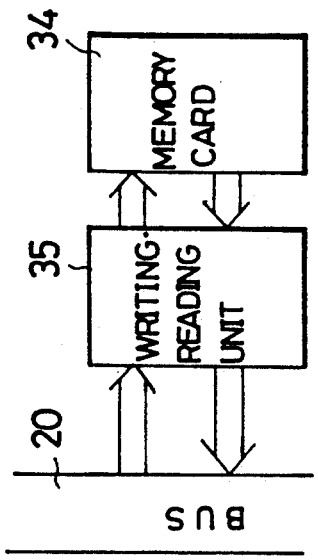
FIG. 15 schematically shows a portion of still another embodiment according to the present invention using a memory card.

As a medium for recording still images, for example, a fixed memory such as a memory card may be used as shown in FIG. 15. In FIG. 15, reference numeral 34 designates a memory card, and 35 a unit for writing and reading data to and from this memory card. The writing and reading unit 35 is connected to the bus 20 in the same way as that in FIG. 1, and writing and reading operation are carried out similarly to an ordinary fixed memory according to the instructions from the CPU 17.

In the foregoing, the embodiments for the electronic still camera are explained. The still image recording apparatus according to the present invention can be applied to various devices capable of recording images in digital form, such as VTR, DAT, and video disk recorder.

Many widely different embodiments of the present invention may be constructed without departing from the spirit and scope of the present invention. It should be understood that the present invention is not limited to the specific embodiments described in this specification, except as defined in the appended claims.

What is claimed is:

1. A still image recording method of recording still images on a recording medium, comprising the steps of:
   storing image signals of a plurality of fields, supplied in sequence;
   reading out the stored image signals of a first field in synchronization with image signals of a second field which is subsequent to said first field;
   calculating differences in level between each of the image signals of the first field and each of the image signals of the second field, respectively;
   accumulating the calculated differences of the image signals to produce an accumulated value;
   comparing the accumulated value with a predetermined value to produce a result signal representative of the result of the comparison; and
   executing frame recording of the image signals on the recording medium when said result signal indicates that the accumulated value is equal to or less than the predetermined value, and executing field recording of the image signals on the recording medium when said result signal indicates that the accumulated value is greater than the predetermined value.

2. A method as claimed in claim 1, wherein said method further comprises a step of sequentially converting analog video signals into digital image signals before the storing step.

3. A method as claimed in claim 1, wherein said reading out step includes a step of reading out the stored image signals of the first field for half a horizontal scanning period in comparison with the image signal of the second field.

4. A method as claimed in claim 1, wherein said executing step includes a step of selecting either the frame recording or the field recording after a plurality of fields have been compared.

5. A still image recording apparatus for recording still images on a recording medium, comprising:
   means for storing image signals of a plurality of fields, supplied to the apparatus in sequence;
   means for reading out the image signals of a first field, stored in said storing means, in synchronization with image signals of a second field which is subsequent to said first field;
   means for calculating differences in level between each of the image signals of the first field and each of the image signals of the second field, respectively;
   means for accumulating the calculated differences of the image signals to produce an accumulated value;
   means for comparing the accumulated value with a predetermined value to produce a result signal representative of the result of the comparison; and
   means for executing frame recording of the image signals on the recording medium when said result signal indicates that the accumulated value is equal to or less than the predetermined value, and executing field recording of the image signals on the recording medium when said result signal indicates that the accumulated value is greater than the predetermined value.

6. An apparatus as claimed in claim 5, wherein said apparatus further comprises means for sequentially converting analog video signals into digital image signals.

7. An apparatus as claimed in claim 5, wherein said storing means includes a plurality of image memories capable of storing image signals of a plurality of fields, respectively.

8. An apparatus as claimed in claim 5, wherein said apparatus further includes means for detecting a vertical synchronization signal in each field of analog video signals, and means for controlling a timing for reading out the image signals from said storing means by means of said reading out means, in accordance with the detected vertical synchronization signal.

9. An apparatus as claimed in claim 7, wherein said reading out means includes means for reading out the image signals of a first field, stored in one of said image memories, in synchronization with image signal of a second field which is subsequent to said first field, said image signals of the second field being just supplied to the apparatus.

10. An apparatus as claimed in claim 7, wherein said reading out means includes means for reading out the image signals of a first field, stored in one of said image memories, in synchronization with image signals of a second field which is subsequent to said first field, said image signals of the second field being stored in another one of said image memories.

11. An apparatus as claimed in claim 5, wherein said reading out means includes means for reading out the stored image signals of the first field for half a horizontal scanning period in comparison with the image signals of the second field.

12. An apparatus as claimed in claim 5, wherein said calculating means includes a subtracter for calculating differences between the synchronized image signals of the first and second fields.

13. An apparatus as claimed in claim 5, wherein said accumulating means includes an adder for adding the calculated differences with each other to obtain accumulated value of the differences.

14. An apparatus as claimed in claim 5, wherein said comparing means includes a comparator for comparing the accumulated value with a predetermined value.

15. An apparatus as claimed in claim 5, wherein said executing means includes means for selecting either the frame recording or the field recording after a plurality of fields have been compared.

16. An apparatus as claimed in claim 5, wherein said recording medium is formed of a detachable magnetic storage medium.

17. An apparatus as claimed in claim 16, wherein said magnetic storage medium is a magnetic tape.

18. An apparatus as claimed in claim 16, wherein said magnetic storage medium is a magnetic disk.

19. An apparatus as claimed in claim 5, wherein said recording medium is formed of a detachable fixed storage medium.

20. An apparatus as claimed in claim 19, wherein said fixed storage medium is a memory card.

21. An electronic still camera for recording still images on a recording medium, comprising:
   means for picking up a picture of an object image to generate picture signals;
   means for processing the generated picture signals to produce image signals;
   means for storing image signals of a plurality of fields, supplied to the camera in sequence;
   means for reading out the image signals of a first field, stored in said storing means, in synchronization with image signals of a second field which is subsequent to said first field;
   means for calculating differences in level between each of the image signals of the first field and each of the image signals of the second field, respectively;
   means for accumulating the calculated differences of the image signals to produce an accumulated value;
   means for comparing the accumulated value with a predetermined value to produce a result signal representative of the result of the comparison; and
   means for executing frame recording of the image signals on the recording medium when said result signal indicates that the accumulated value is equal to or less than the predetermined value, and executing field recording of the image signals on the recording medium when said result signal indicates that the accumulated value is greater than the predetermined value.

* * * * *